US012726079B2

(12) United States Patent
Margolis

(10) Patent No.: US 12,726,079 B2
(45) Date of Patent: Sep. 1, 2026

(54) CONTINUOUS PUSH ELECTRICITY GENERATION DEVICE

(71) Applicant: Alexander Margolis, Karmiel (IL)

(72) Inventor: Alexander Margolis, Karmiel (IL)

( * ) Notice: Subject to any disclaimer, the term of this patent is extended or adjusted under 35 U.S.C. 154(b) by 181 days.

(21) Appl. No.: 18/569,720

(22) PCT Filed: Jun. 14, 2022

(86) PCT No.: PCT/IL2022/050637
§ 371 (c)(1),
(2) Date: Dec. 13, 2023

(87) PCT Pub. No.: WO2022/264137
PCT Pub. Date: Dec. 22, 2022

(65) Prior Publication Data

US 2024/0283327 A1 Aug. 22, 2024

(30) Foreign Application Priority Data

Jun. 14, 2021 (IL) .......................................... 283984

(51) Int. Cl.
*H02K 7/18* (2006.01)
*B60B 19/00* (2006.01)

(52) U.S. Cl.
CPC ........... *H02K 7/1861* (2013.01); *B60B 19/00* (2013.01)

(58) Field of Classification Search
CPC .... H02K 7/1861; H02K 53/00; H02K 7/1846; H02K 7/00; H02K 35/02; B60B 19/00;
(Continued)

(56) References Cited

U.S. PATENT DOCUMENTS

2011/0042966 A1 2/2011 Kim
2016/0164373 A1 6/2016 Liao et al.
(Continued)

FOREIGN PATENT DOCUMENTS

CN 2589228 Y 12/2003
CN 203491870 U 3/2014
(Continued)

OTHER PUBLICATIONS

CN203491870U English translation (Year: 2025).*
Bitton Oren, International Search Report, Jul. 13, 2022, Israel Patent Office.

*Primary Examiner* — Christopher M Koehler
*Assistant Examiner* — Viswanathan Subramanian
(74) *Attorney, Agent, or Firm* — Decker Jones, PC; Brian K. Yost; Kiala E. Ellingson

(57) ABSTRACT

A continuous push electricity generation device integrated with a loaded rotating member, comprising three or more transmission modules, each of which comprises a receiving member which is pushed in conjunction with the loaded rotating member's portion being in contact with a surface against which the loaded rotating member rolls, while being in a closed relationship with a delivering member, which is connected to a generator rotor shaft. When the receiving member and delivering member correspondingly move, the rotor shaft rotates in an opposite direction to the loaded rotating member's rotation. The device also comprises one electricity generation module, comprising a power generation rotor being in connection with the rotor shaft, and a stator. The stator is fixedly connected to the loaded rotating member's shaft and to the rotating member. The rotor shaft's rotation in an opposite direction to the loaded rotating member's rotation results with a relative rotation of the
(Continued)

power generation rotor with respect to the stator, thereby generating electricity.

10 Claims, 5 Drawing Sheets

(58) Field of Classification Search
CPC ... F03G 7/081; F03G 7/08; H02P 3/18; H02P 9/00; B60G 2204/30; B60G 2300/60; Y02T 10/80; Y10S 903/906; B60L 50/00; H02J 7/1476
USPC .......................................................... 310/67
See application file for complete search history.

(56) References Cited

U.S. PATENT DOCUMENTS

| | | | |
|---|---|---|---|
| 2016/0233755 | A1 | 8/2016 | Bayrakdar |
| 2017/0338719 | A1 | 11/2017 | Park |

FOREIGN PATENT DOCUMENTS

| | | | |
|---|---|---|---|
| CN | 103818246 | A | 5/2014 |
| CN | 110848102 | A | 2/2020 |
| CN | 112271874 | A | 1/2021 |
| EP | 3540921 | A1 | 9/2019 |
| KR | 20140002382 | | 1/2014 |
| WO | WO 2018/190515 | | 3/2018 |

* cited by examiner

CONTINUOUS PUSH ELECTRICITY GENERATION DEVICE

FIELD OF THE INVENTION

The present invention is in the fields of electric power generation. More specifically, the invention relates to a continuous push electricity generation device which is embedded in a load carrying wheel, while rolling against a surface.

BACKGROUND OF THE INVENTION

The continuous effort to reduce greenhouse gases emissions derives a widening use of electricity produced by utilizing low emission and renewable energy sources.

One example is the widening use of hybrid and electric vehicles that use stored electricity as well as residual energy during vehicle's braking, for reducing the use of internal combustion engines. However, while the automotive industry invests vast resources for improving the efficiency and the power delivered by electric motors, the travel range of electric vehicles is still limited to the storage capacity of the vehicle's battery.

Furthermore, reusing vehicle braking energy requires adding multiple complex and expensive components to the vehicle's systems, where the added components/systems require intensive maintenance due to their intermittent energy consumption/generation cycles. Moreover, generating electricity in such an intermittent manner is intrinsically limited in its capacity.

It is therefore an object of the present invention, to provide a continuous push electricity generation device which is embedded in a load carrying wheel, rolling against a surface.

It is another object of the present invention, to provide a continuous push electricity generation device, which exploits the compression applied on a load carrying wheel by a surface against which the loaded wheel rolls, to continuously generate electric power.

Other objects and advantages of the invention will become apparent as the description proceeds.

SUMMARY OF THE INVENTION

The invention relates to a continuous push electricity generation device integrated with a loaded rotating member, comprising: a) three or more transmission modules, each of which comprises a receiving member which is pushed in conjunction with the loaded rotating member's portion being in contact with a surface against which the loaded rotating member rolls, while being in a closed relationship with a delivering member, which is connected to a generator rotor shaft, whereas the receiving member and delivering member correspondingly move, the rotor shaft rotates in an opposite direction to the loaded rotating member's rotation, and b) one electricity generation module, comprising a power generation rotor being in connection with the rotor shaft, and a stator, wherein the stator is fixedly connected to the loaded rotating member's shaft and to the rotating member, characterized with that the rotor shaft's rotation in an opposite direction to the loaded rotating member's rotation results with a relative rotation of the power generation rotor with respect to the stator, thereby generating electricity.

According to an embodiment of the invention, the rotating member is selected from a group of wheels and rollers, for instance, the device may be embedded in a vehicle's wheel, while the three or more transmission modules are radially deployed within the wheel's rim.

According to an embodiment of the invention, the vehicle's wheel comprises a tire, wherein the receiving members of each of the three or more transmission modules protrude to the wheel's tire cavity, thus moving in correspondence with the depression of the tire portion being in contact with the ground.

According to an embodiment of the invention, the receiving member is provided with suspension means such as hydraulic or pneumatic means, thereby suspending the rotation load exerted on the rotor shaft.

According to an embodiment of the invention, the receiving member comprises a partially elastic container filled with a fluid substance, a first portion thereof being compressed results in an increase of a second portion thereof, which forces the delivering member to rotate the rotor shaft.

BRIEF DESCRIPTION OF THE DRAWINGS

The above and other characteristics and advantages of the invention will be better understood through the following illustrative and non-limitative detailed description of preferred embodiments thereof, with reference to the appended drawings, wherein.

DETAILED DESCRIPTION OF THE INVENTION

The present invention relates to a continuous push electricity generation device, essentially comprising three or more transmission modules that mechanically convert the compression applied on a loaded rotating member during its interaction with a surface, against which the loaded rotating member rolls (e.g., a reaction to a vehicle's weight applied by its wheels on the ground) to a continuous rotation of a rotor shaft, with respect to a stator element in a rotor-stator electrical generation arrangement, to thereby continuously generate electricity during travelling or rotation of the loaded rotating member (the rotating member may be, for example, a wheel or a roller).

Each transmission module comprises a receiving member which is pushed in conjunction with the proximal portion of the rotating member being compressed or pushed by an interaction force from the surface reacting to the rotating member load (e.g., different portion of a vehicle's wheel is periodically founded in interaction when contacting the ground) and correspondingly motivate a delivering member which rotates a rotor shaft by a predetermined angle. The rotor shaft rotates a power generation rotor within a stator element in a rotor-stator electrical generation arrangement, thereby producing electrical energy. The sequential compression of transmission modules results in a continuous rotation of the rotor shaft, and thereby in a continuous power generation.

In the following detailed description, references are made to the accompanying drawings that form a part hereof, and which are shown by way of illustrating specific embodiments or examples. These embodiments may be combined, other embodiments may be utilized, and other changes may be made without departing from the spirit or scope of the present invention.

For the sake of simplicity, the following description essentially illustrate the proposed device embedded in a vehicle's wheels rolling against the ground/road, however one skilled in the art will readily appreciate multiple alternative embodiments of the proposed device herein, that can be adapted for use in other applications (e.g., rail guided vehicles, tracked vehicles, conveyors, etc.), in which the compression applied on a loaded rotating member during its interaction with a surface against which the loaded rotating member rolls is converted to a respective motion of electric generator's rotor and stator elements.

Furthermore, while in the following figures the proposed device is illustrated as being embedded within a vehicle's wheel and tire, with non-limiting wheel-tire proportions and sizes, those can be readily determined by one skilled in the art according to specific vehicle applications, sizes, weights, etc.

Figure 1:
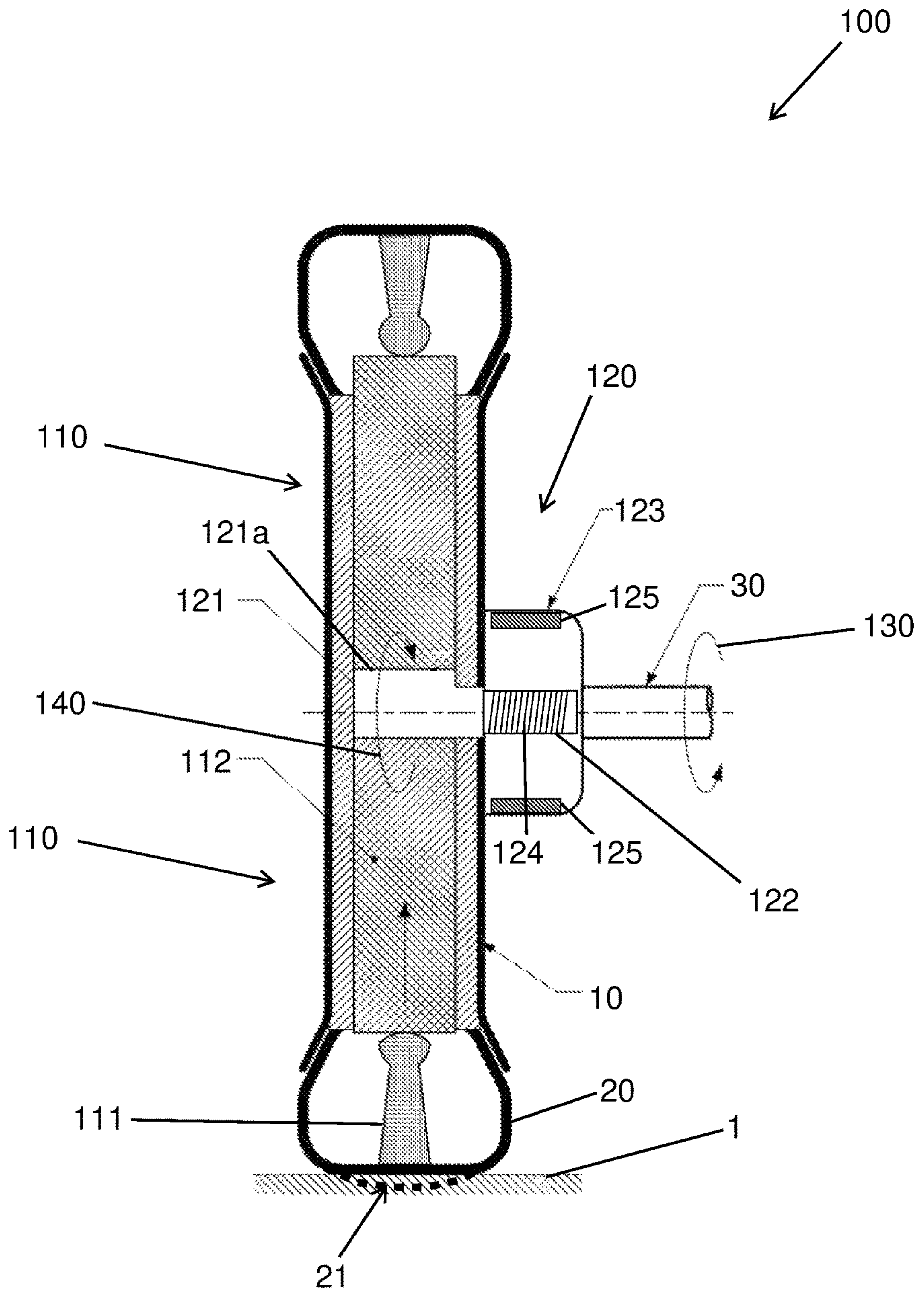
FIG. 1 schematically illustrates a section view of a continuous push electricity generation device integrated with a road vehicle's wheel, according to an embodiment of the present invention.

FIG. 1 schematically illustrates a sectional view of a continuous push electricity generation device integrated with a road vehicle's wheel, according to an embodiment of the present invention. Device 100 comprises transmission modules 110 (two of which are shown in FIG. 1) being embedded within the wheel rim 10 in a radial deployment (further illustrated in the following figures), and an electricity generation module 120.

Each transmission module 110 comprises a receiving member 111 which is pushed by an interaction force from ground 1 to move upwardly in conjunction with the proximal portion of tire 20 being depressed 21 (i.e., due to the vehicle's weight interaction with ground 1), and a delivering member 112, which is in a close relationship with receiving member 111. when the moving vehicle's wheel rolls, each time a different portion of tire 20 becomes depressed, and hence, different receiving members 111 and delivering members 112 are sequentially actuated. Delivering members 112 are connected to an eccentrically protruding portion 121*a* of rotor shaft 121, such as to rotate rotor shaft 121 by delivering members 112 when each of the latter is moved by a corresponding receiving member 111, resulting in the continuous rotation of a power generation rotor 122 which is concentrically connected to rotor shaft 121. As a result, power generation rotor 122 concentrically rotates inside a stator 123, thereby generating electricity.

Stator 123 is fixedly connected to the wheel rim 10 and to wheel shaft 30, and hence, rotates at the same direction 130 (i.e. determined by the vehicle's travel direction), the connection of delivering member 112 to rotor shaft 121 is geometrically arranged for rotating rotor shaft 121 in the opposite direction 140, resulting in an effective relative rotation of power generation rotor 122 within stator 123 for efficiently generating electrical power.

Of course, multiple rotor-stator arrangements known in the art may be utilized in lieu or in conjunction with power generation rotor 122 and stator 123 for generating electricity by utilizing the rotation of rotor shaft 121. Furthermore, rotor shaft 121 and power generation rotor 122 may either be of a single shaft having two differently shaped portions or two shafts being connected together. Moreover, electricity generation module 120 can be connected to the vehicle's electrical circuitry in multiple different ways known in the art, for utilizing and/or for storing the generated electricity for later use (e.g., for propelling an electric motor).

Receiving member 111 can be designed in multiple different shapes and sizes for optimally receiving the tire depression 21, while being adapted to different corresponding rim and tire arrangements. For instance, suitable spacers can be added to receiving member 111, or other adaption means can be utilized for adjusting the ratio between the depression extent of tire portion 21 and the shifting of delivering member 112. This enables the utilization of standardized design of device 100 with different sizes of wheel rims 10 and tires 20, as well as optimizing the rotation speed of rotor shaft 121 achieved with a given depression 21 of tire 20, thereby optimizing the electricity generation obtained with an individual vehicle with no need to change or replace the rim or the tire.

In order to prevent loss of air pressure from the tire due to the operation of the electricity generation device, sealing is required. Also, since the push electricity generation device is mounted on the vehicle's wheel, it may be sealed to prevent the penetration of water and humidity while the vehicle moves in rainy atmosphere or while passing puddles. Sealing may be done using known materials and technologies, which are clear to any person skilled in the art.

Figure 2:
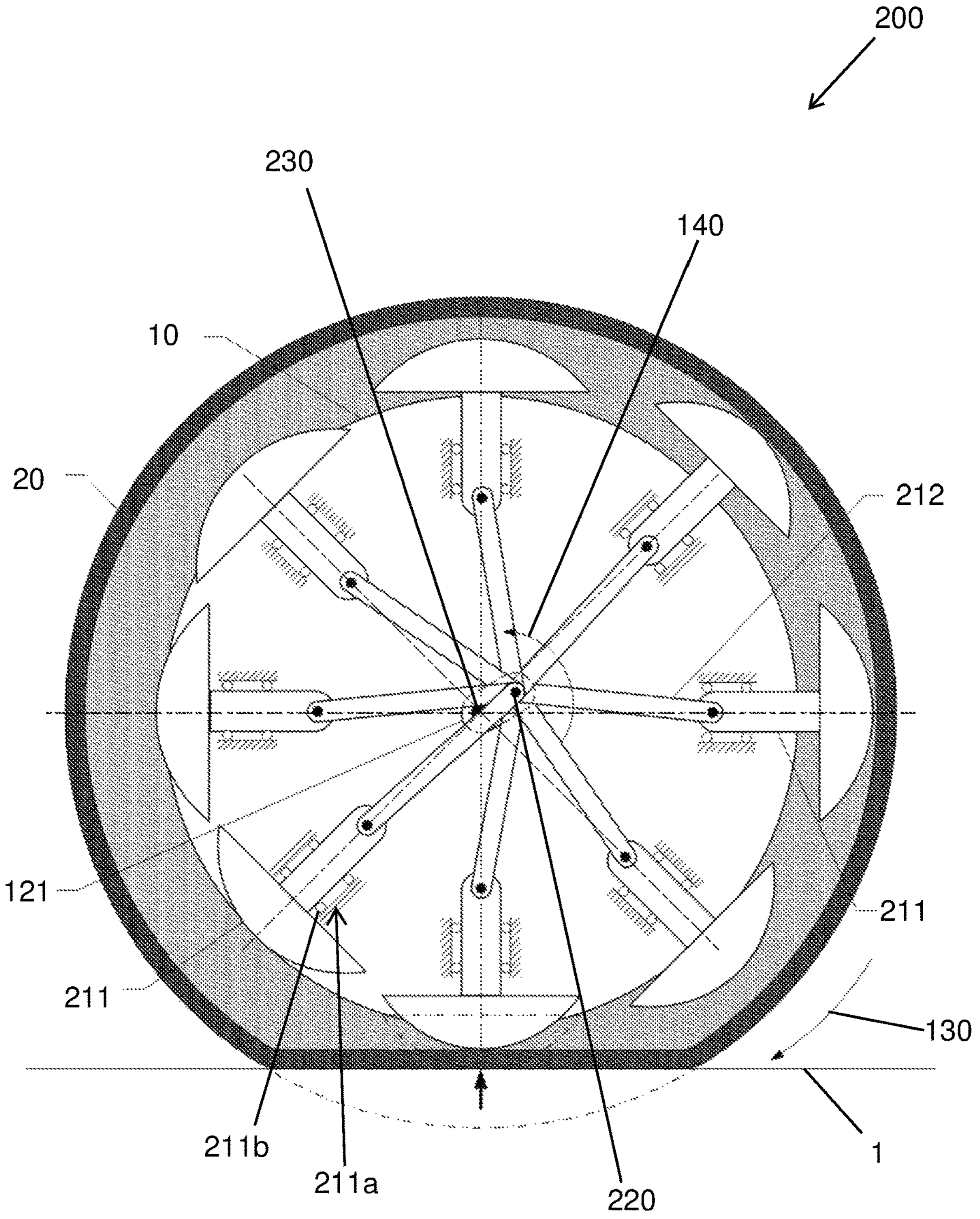
FIG. 2 schematically illustrates a partial section view of a continuous push electricity generation device integrated with a road vehicle's wheel, according to an embodiment of the present invention.

FIG. 2 schematically illustrates a partial section view of a continuous push electricity generation device integrated with a road vehicle's wheel, according to an embodiment of the present invention. Device 200 comprises eight transmission modules, each of which is essentially comprised of linearly moving receiving members 211 having a convex design. Thus each of which is gradually pushed in turn in conjunction with the corresponding portion of tire 20 being compressed by an interaction force from ground 1 (i.e., an alternate design to member 111 of FIG. 1). Members 211 linearly slide within corresponding cavities 211*a* (e.g., utilizing linear bearings 211*b*), and are movably connected to delivering rods 212 which are connected to an eccentric hinge 220 of rotor shaft 121 in a common hinging location or in multiple separate eccentric locations of hinge 220.

When the vehicle moves and the wheel revolves in direction 130, receiving members 211 are being sequentially compressed by an interaction force from ground 1, while shifting delivering rods 212 correspondingly, to rotate rotor shaft 121 in direction 140. As a result, eccentric hinge 220 (e.g., cam) is pushed to rotate around the centeral axis 230 of rotor shaft 121, which is concentric with wheel shaft 30, rim 10 stator 123, and power generation rotor 122 (of FIG. 1) in direction 140.

According to some embodiments of the invention, shock absorbing means (not shown in FIG. 2) are utilized in conjunction with receiving members 211, for protecting rotor shaft 121 from loads exceeding a predetermined threshold (i.e., according to which specific shock absorbing means are selected), such as when a vehicle's wheel hits a speed bump, or other obstacles, or when a wheel losses/regains contact with the ground.

The sequential push of receiving members 211 (i.e., forced by the rolling of the moving vehicle's wheels while carrying its weight), exerting the corresponding sequential movement of delivering rods 212, and there through the continuous rotation of rotor shaft 121 and of power generation rotor 122, thereby enabling a steady generation of electricity. Furthermore, the dome shape design of receiving members 211 enables a smooth transition between the compression of individual members 211, thereby providing a smooth continuous load transfer through delivering rods 212 to rotor shaft 121.

Figure 3:
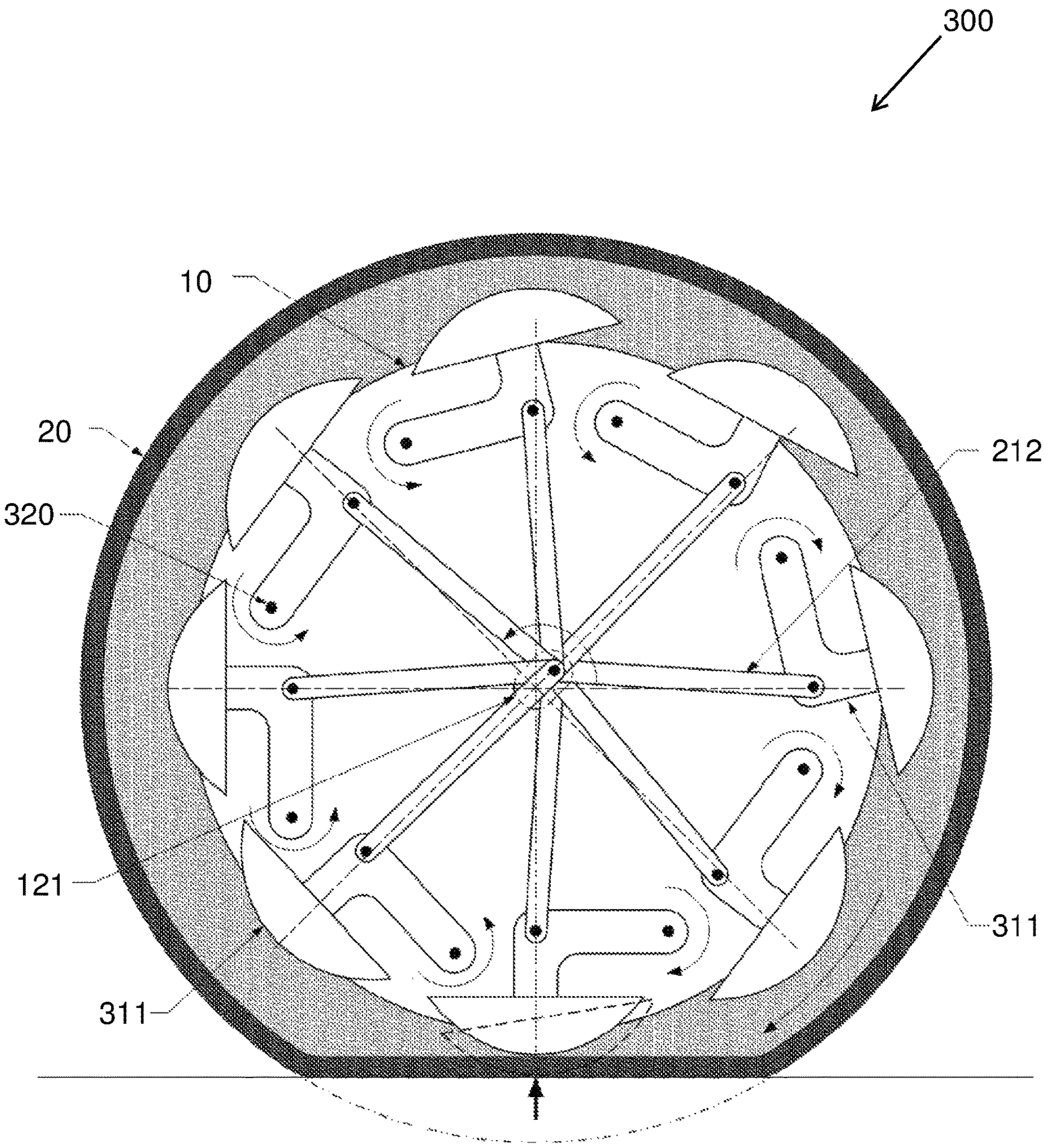
FIGS. 3-5 schematically illustrate alternative configurations of a continuous push electricity generation device integrated with a road vehicle's wheel, according to embodiments of the present invention.

FIG. 3 schematically illustrates an alternative configuration of a continuous push electricity generation device integrated with a road vehicle's wheel, according to an embodiment of the present invention. Device 300 comprises rotationally moving receiving members 311 (i.e., alternative to receiving members 211 of FIG. 2) locally rotating around hinges 320 which are fixed to rim 10. Receiving members 311 are movably connected to delivering rods 212 which are connected to an eccentric hinge 220 of rotor shaft 121 (e.g., a cam shaft).

This configuration of the proposed device may provide lower maintenance costs, such as by using rotational bearings with hinges 320, in lieu of slide bearings (e.g., bearings 211*b* of device 200).

According to some embodiments of the invention, the proposed device is adapted for higher loads, such as those applied by heavier vehicles or tough road conditions. In such applications, suspension means are required to be integrated as will be illustrated in the following figures. The suspension means suspend the rotation load exerted on the rotor shaft.

Figure 4:
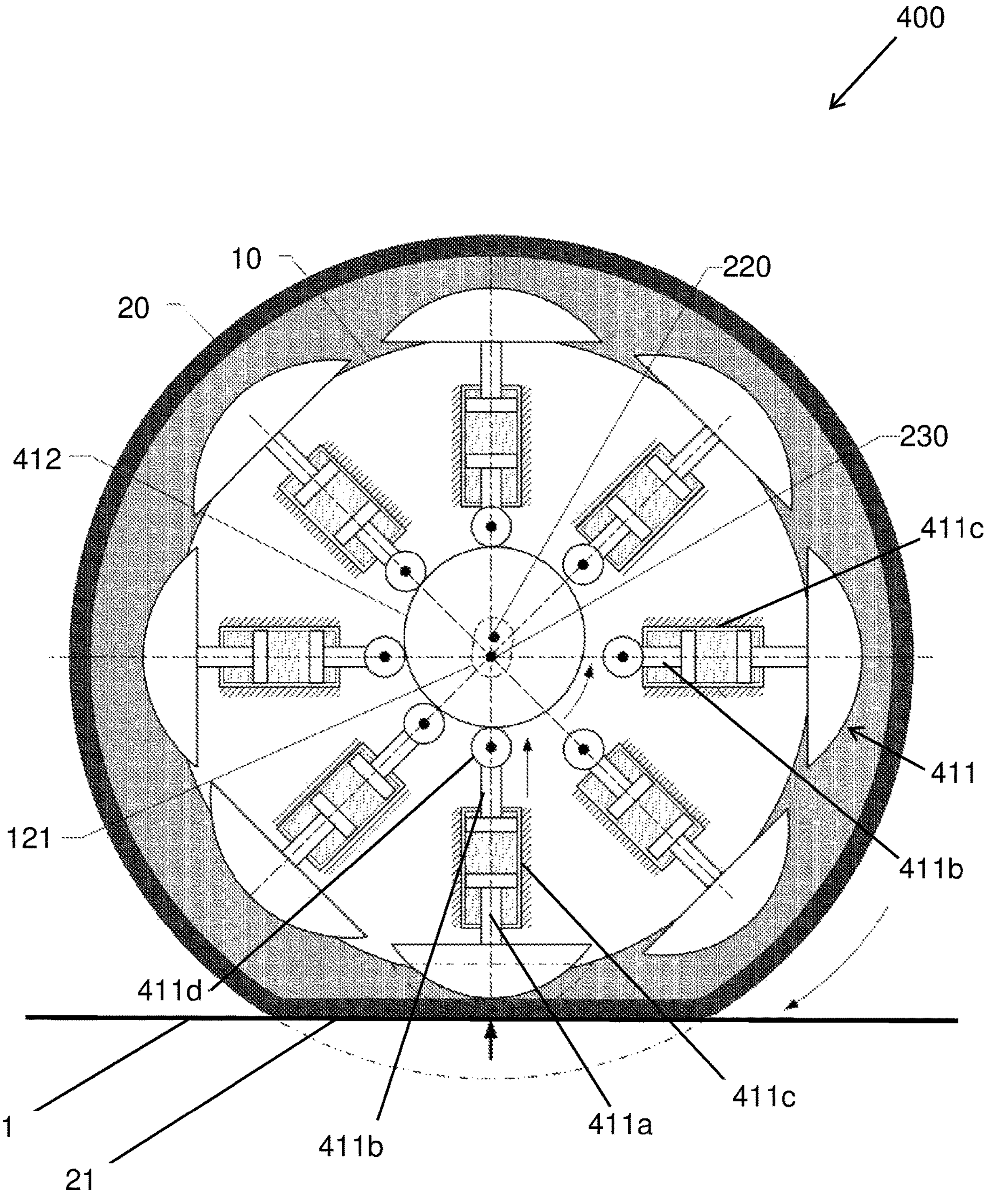

FIG. 4 schematically illustrates an alternative configuration of a continuous push electricity generation device integrated with a road vehicle's wheel, according to an embodiment of the present invention. Here, device 400 comprises hydraulic/pneumatic receiving members 411 (i.e., alternative to receiving members 211 and 311 of FIGS. 2 and 3) slidably connected to a central delivering member 412 (i.e., alternative to delivering rods 211). Receiving members 411 comprise two separate components 411*a* and 411*b*, moving through hydraulic/pneumatic cylinders 411*c* which are fixed to rim 10 (of course, while components 411*a* and 411*b* are illustrated in FIG. 4 collinearly arranged in cylinders 411*c*, alternate non-collinear hydraulic/pneumatic arrangements can also be utilized for the same function), In this embodiment, when each component 411*a* is being pushed by depressed portion 21 of tire 20, it compresses the fluid/gas within cylinders 411*c*, thus pushing component 411*b* in a suspended manner, where a pusher 411*d* (e.g., a finger element) of component 411*b* pushes (i.e., while sliding and/or rolling against) delivering member 412, which is eccentrically connected to rotor shaft 121 (i.e., through hinge 220) so as to rotate rotor shaft 121 around its center axis 230.

Figure 5:
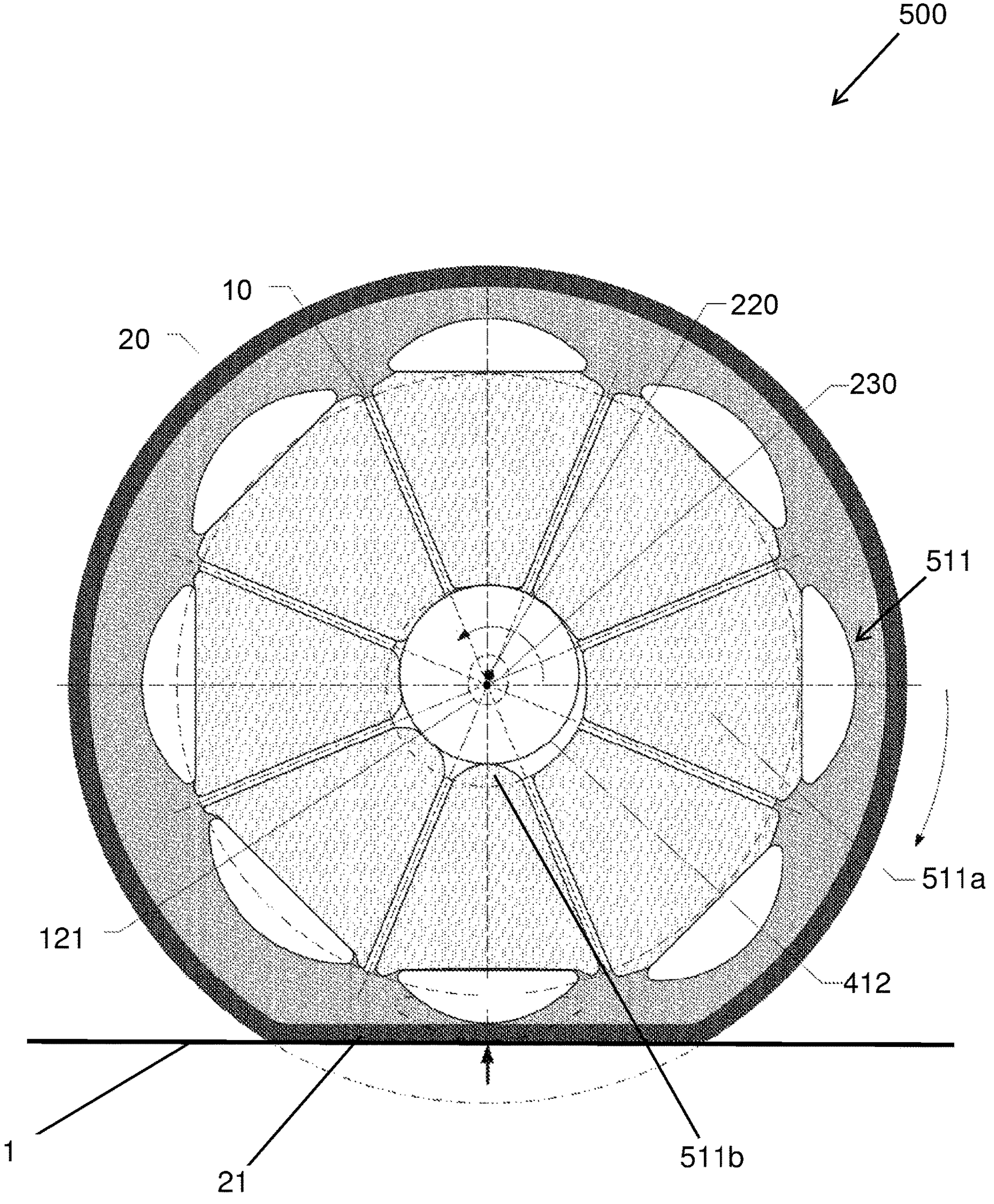

FIG. 5 schematically illustrates an alternative configuration of a continuous push electricity generation device integrated with a road vehicle's wheel, according to an embodiment of the present invention. Here, device 500 comprises alternative pneumatic/hydraulic receiving members 511 utilizing variable pneumatic/hydraulic pressure in a container such as partially elastic cushions 511*a* for converting the compression of receiving members 511 to a rotation of central delivering member 412 (e.g., a cam). When each receiving member 511 is being pushed by depressed portion 21 of tire 20, it compresses the proximal portion of a corresponding cushion 511*a*, thereby forcing a corresponding quantity of pneumatic/hydraulic substance to flow and increase distal portion 511*b* toward delivering member 412 pushing it continuously by subsequent cushions 511*a* to continuously rotate rotor shaft 121. Each partially elastic cushion 511*a* is confined between two (radial) rigid lateral partitions that separate it from its neighboring cushions and the rim walls. Therefore, deformation in the cushion 511*a* (in response to pressure applied to receiving member 511) is possible only in its distal portion, which interacts with the eccentric hinge 220.

In one embodiment, the receiving member comprises a partially elastic container that is filled with a fluid substance. When a first portion of the partially elastic container is compressed, this results in an increase of a second portion thereof, which forces the delivering member to rotate the rotor shaft A person skilled in the art will readily appreciate alternative hydraulic/pneumatic means in which devices 400 or 500 can maintain hydraulic/pneumatic pressure, as well as different suspension means that can be used such as elastic means (e.g., spring), in accordance with specific applications, such as, without departing from the principals claimed by the present invention.

Of course, while FIGS. 1 through 5 illustrate specific conversion arrangements and components, multiple different alternate conversion arrangements can be selected one skilled in the art for realizing further embodiments of the proposed continuous push electricity generation device, namely, for converting compression applied on a load carrying wheel during the interaction between the wheel and a surface against which the loaded wheel rolls, to electricity. Furthermore, while each of FIGS. 1 through 5 illustrates a conversion arrangement comprising a combination of specific components (e.g., receiving members, delivering members, etc.), further embodiments of the invention may be realized while integrating selected components from the different embodiments of FIGS. 1 through 5. For instance, a continuous push electricity generation device that employs rotationally moving receiving members 311 (FIG. 3), may be realized in conjunction with hydraulic/pneumatic cylinders 411*c* (FIG. 4), that may provide a higher combined shock absorption.

Although embodiments of the invention have been described by way of illustration, it will be understood that the invention may be carried out with many variations, modifications, and adaptations, without exceeding the scope of the claims.

The invention claimed is:

1. A continuous push electricity generation device integrated with a loaded rotating member having a central rim and a proximal portion interactable with a stationary surface, wherein said loaded rotating member is concentrically rotated by an axle, said continuous push electricity generation device comprising:

a) a single electricity generation module, comprising a stator which is fixedly connected to the central rim of said loaded rotating member and to the axle, a rotor rotatable within said stator for generating electrical power, and a rotor shaft connected to said rotor that is rotatably mounted onto the central rim so as to be coaxial with, and rotatable relative to, the axle; and b) three or more transmission modules, each of said transmission modules comprising a receiving member configured with a first element that is movably mounted within the central rim of said loaded rotating member and with a second element located within an annular space between the central rim and the proximal portion of said loaded rotating member, and a delivering member eccentrically connected to said rotor shaft and positionable in force transmitting relation with the first element of said receiving member of a same transmission module, wherein the second element of each of said receiving members is sequentially pushed during interaction between said loaded rotating member and the stationary surface against which said loaded rotating member rolls any one of two rotational directions, to cause the first element corresponding to the pushed second element to transmit a reactive force applied by the stationary surface to said delivering member of the same transmission module, wherein the reactive force transmitted to said eccentrically connected delivering member causes the rotor shaft to rotate relative to said stator, thereby generating electricity.

2. The device according to claim 1, wherein the rotating member is selected from a group of wheels and rollers.

3. The device according to claim 2, wherein the rotating member is a tire, and each corresponding second element of the three or more transmission modules is pushed in response to depression of a tire portion in contact with a ground surface.

4. The device according to claim 1, wherein each first element of the three or more transmission modules has at least a portion that is of a radially extending orientation and each of the three or more transmission modules is circumferentially spaced one from the other.

5. The device according to claim 1, wherein each corresponding first element of the three or more transmission modules is adapted to move in a linear manner.

6. The device according to claim 1, wherein each corresponding second element of the three or more transmission modules is adapted to move in a rotational manner.

7. The device according to claim 1, wherein the receiving member is additionally provided with suspension means, thereby suspending a rotational load exerted on the rotor shaft.

8. The device according to claim 7, wherein the suspension means are selected from the group consisting of: hydraulic cylinder, pneumatic cylinder, elastic means or any combination thereof.

9. The device according to-claim 1, wherein the receiving member comprises a partially elastic container filled with a fluid substance, a first portion thereof being compressed results in an increase of a second portion thereof, which forces the delivering member to rotate the rotor shaft.

10. The device according to claim 1, wherein the reactive force transmitted to the delivering member causes the rotor shaft to rotate in an opposite direction to the stator, thereby generating electricity.

* * * * *